Jan. 19, 1965 O D PARHAM 3,166,682

TUNNEL DIODE NOR GATE

Filed May 24, 1963 3 Sheets-Sheet 1

INVENTOR.
OD PARHAM,
BY
Robert H. Himes
ATTORNEY.

INVENTOR
O D PARHAM,
BY Robert H. Himes
ATTORNEY.

Jan. 19, 1965 O D PARHAM 3,166,682

TUNNEL DIODE NOR GATE

Filed May 24, 1963 3 Sheets-Sheet 3

INVENTOR
O D PARHAM,
BY
Robert H. Himes
ATTORNEY.

United States Patent Office 3,166,682

Patented Jan. 19, 1965

3,166,682
TUNNEL DIODE NOR GATE

O D Parham, Downey, Calif., assignor to Hughes Aircraft Company, Culver City, Calif., a corporation of Delaware Filed May 24, 1963, Ser. No. 282,920
4 Claims. (Cl. 307—88.5)

This invention relates to digital computer gating devices hereafter designated as "or" and "nor" gates and, more particularly, to digital computer gating apparatus capable of providing extremely fast logic rates.

The present application for patent is a continuation-in-part of application for patent, Serial No. 188,688, entitled "Digital Computer Gating Device," by O D Parham, filed April 19, 1962.

In the mechanization of apparatus for performing various computational problems, speed requirements have often necessitated the use of a parallel system as distinguished from a serial system. Serial systems or subsystems made feasible by the gating devices of the present invention operate with sufficient speed as to minimize the need for parallel type systems.

It is therefore an object of the present invention to provide an improved digital computer gating apparatus.

Another object of the present invention is to provide digital computer gating apparatus capable of providing extremely fast logic rates.

Still another object of the present invention is to provide "or" and "nor" gating devices capable of operating at clock rates in excess of 400 megacycles.

A further object of the present invention is to provide "or" and "nor" digital computer gating devices which exploit the characteristics of tunnel and backward diodes.

A still further object of the present invention is to provide "nor" and "or" digital computer gating devices which have greater "fan-in" and "fan-out" capability together with improved voltage current regulation with respect to loading.

In accordance with the present invention, current flow through first and second serially connected tunnel diodes is controlled by third and fourth serially connected tunnel diodes connected from the junction therebetween in a manner to produce changes in potential level thereat which constitutes the output of the device. More particularly, circuitry instrumenting "or" or "nor" logic together with a sinusoidal clock signal applied at the junction between the third and fourth tunnel diodes is employed to divert current from at least one of the first or second tunnel diodes thereby causing a switch in the mode of current flow therethrough. That is, the same value of current through a tunnel diode corresponds to two different voltage drops thereacross, the particular one depending upon whether or not the peak current, $I_p$, of the particular tunnel diode had been exceeded. Further, it has been determined that switching between modes of current flow through a tunnel diode takes place in a period of time less than 0.3 nanosecond thus making it possible to achieve extremely fast switching. Lastly, the sinusoidal clock signal which may have a frequency as high as 400 megacycles or more periodically clears the gating devices of the present invention.

The above-mentioned and other features and objects of this invention and the manner of obtaining them will become more apparent by reference to the following description taken in conjunction with the accompanying drawings wherein.

Figures 4, 5:
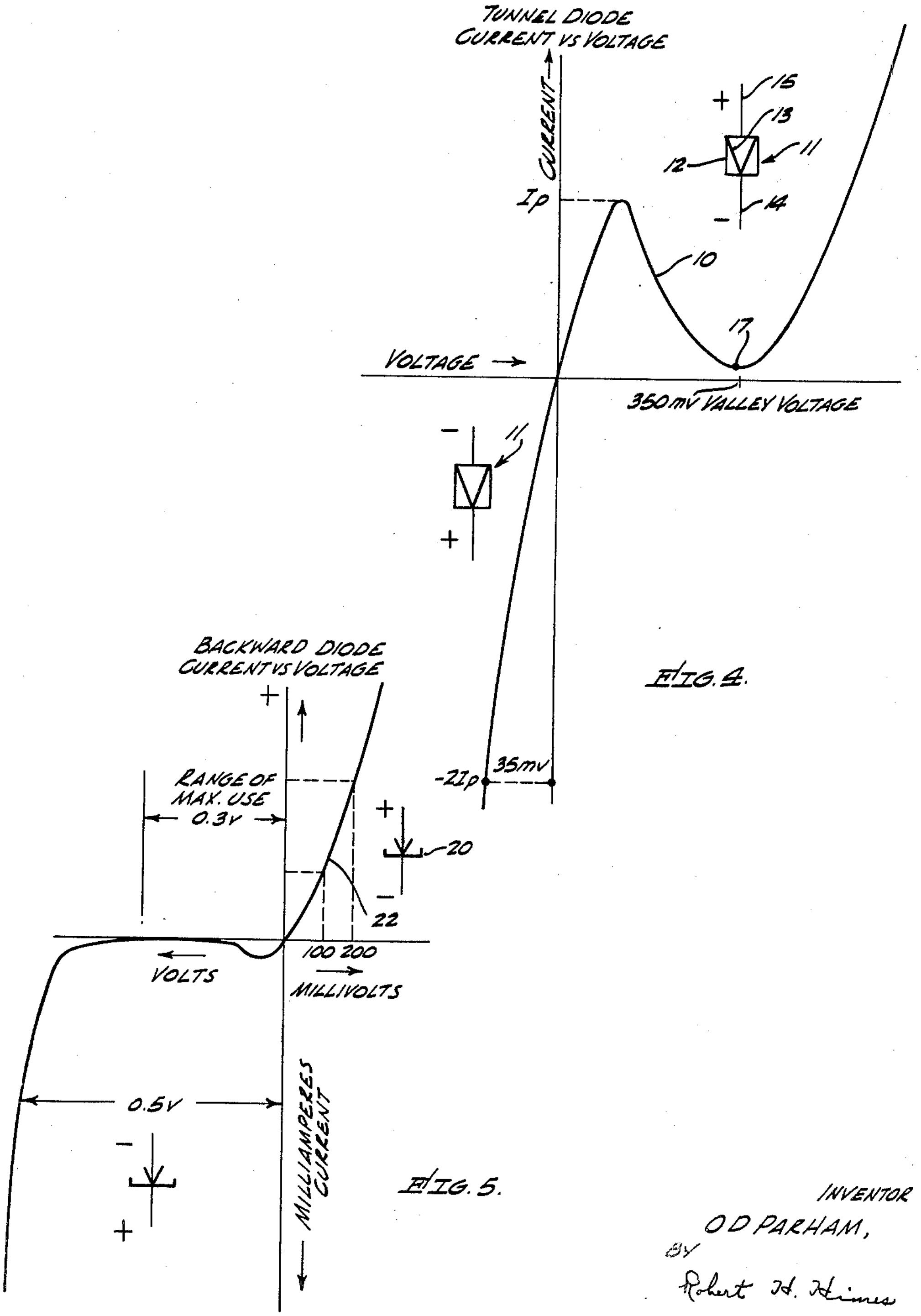
FIGS. 4 and 5 illustrate typical current-voltage characteristics of tunnel and backward diodes of the type employed in the apparatus of FIGS. 1–2.

In the following description of the present invention, reference is made to tunnel and backward diodes. Referring to FIGS. 4 and 5 of the drawings, there is illustrated current-voltage characteristics of tunnel and backward diodes, respectively, together with the manner in which they are designated in the remainder of the drawings. Referring now to FIG. 4, there is illustrated a typical current vs. voltage characteristic 10 of the tunnel diode wherein current flow is indicated along the ordinate and voltage-drop across the diode is indicated along the abscissa. In addition, a symbol 11 is employed to designate a tunnel diode. Symbol 11 constitutes a square 12 enclosing a V 13 which extends from one side of the square 12 to the mid-point of the opposite side thereof. Cathode lead 14 connects to the vertex of the V 13 and an anode lead 15 connects to the mid-point of the side of the square 12 opposite the vertex of the V 13. Normal current flow through the tunnel diode 11 is considered to be from anode 15 to cathode 14 and is represented by positive values of current flow of the characteristic 10. Current flow through the tunnel diode 11 in a backward direction is considered to be current flow from the cathode 14 to the anode 15. Under these circumstances the cathode 14 is necessarily positive relative to the anode 15. Current flow of this type is represented by the negative values of current flow of the characteristic 10. In particular, current flow in a normal direction through a tunnel diode increases in proportion to the voltage drop thereacross until a peak current, $I_p$, is reached. Operation of a tunnel diode at currents less than $I_p$ is designated as operation in the "non-switched" mode, and operation at currents in excess of $I_p$ is designated as operation in the "switched" mode. Further, increasing the current through a tunnel diode is designated as "setting" the tunnel diode, i.e., changing the mode of operation from the non-switched to the switched mode. Lastly, the voltage drop across the tunnel diode corresponding to the peak current, $I_p$, is referred to as the peak voltage $V_p$. After the peak current, $I_p$, is reached, the voltage drop continues to increase with a decrease in current until a null is reached designated by point 17 on the characteristic 10. This null at point 17 is generally referred to as the "valley voltage," $V_v$, of the tunnel diode and occurs, for example, at a voltage of the order of 350 millivolts. Increases in voltage across a tunnel diode in excess of the valley voltage again produce an increase in current flow. With regard to current flow through a tunnel diode in a backward direction, current flow in general increases in proportion to the voltage drop thereacross with a current flow equal to twice the peak current, $I_p$, of the tunnel diode corresponding generally to a voltage drop thereacross equal to 0.1 the valley voltage of the tunnel diode. For the purposes of the present invention, any device having a current-voltage characteristic that is of the same type as the current-voltage characteristic 10 is considered to be the equivalent of a tunnel diode and, as such, is within the scope of the teachings of this specification.

Referring now to FIG. 5 of the drawings, symbol 20 is employed to designate a backward diode and constitutes a short transverse bracket disposed across the lead together with a V having the vertex thereof at the intersection inside the bracket. Normal current flow through a backward diode is considered to be in the direction indicated by the V (when considered as an arrow) and is represented by the portion of a characteristic 22 which corresponds to positive current flow. Backward current flow through a backward diode constitutes current flow therethrough in the opposite direction and corresponds to the portion of characteristic 22 where the current flow is negative. In general, when the current flow through the backward diode is in the normal direction, the potential drop thereacross increases proportionately to the current flow therethrough as illustrated by the upper portion characteristic 22, as viewed in the drawing. In the backward direction, however, there is a slight negative current in regions where the backward voltage drop thereacross is small. This current, however, decreases to zero and remains at zero until voltage drops of the order of 0.4 volt are reached. After this point, current flow rapidly increases with a maximum voltage drop thereacross of the order of 0.5 volt. For this reason, maximum backward voltage normally used across a backward diode having a characteristic of the same type as characteristic 22 is generally of the order of 0.3 volt. Although backward diodes are described in the gating networks of the following embodiments, it is only necessary that this type of diode be used when extremely fast speeds of operation are desired.

Figure 1:
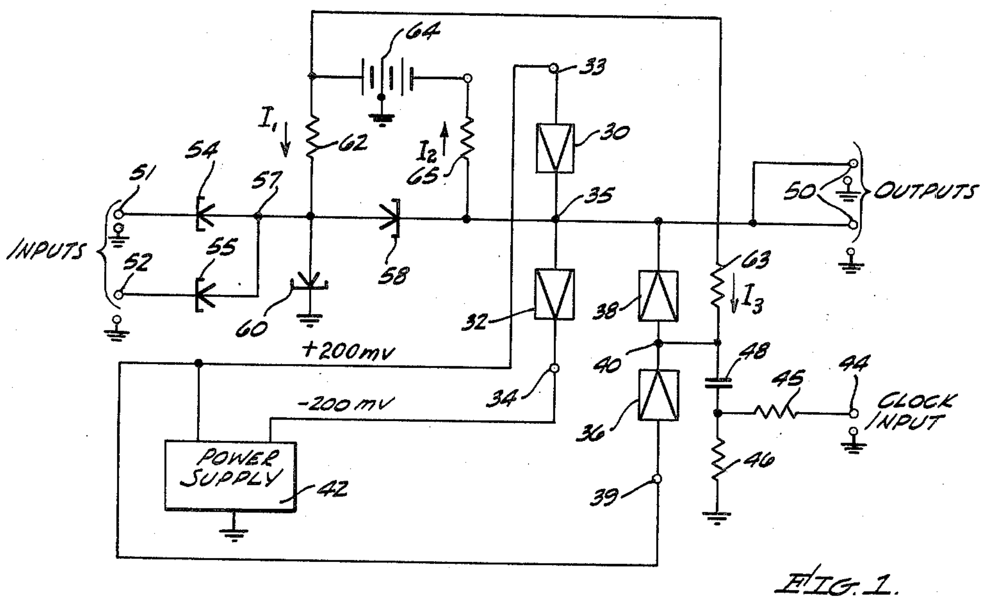
FIG. 1 shows a "P" embodiment of a "nor" gate in accordance with the present invention adapted to deliver current to an output load.

Referring now to FIG. 1 of the drawings, there is shown a preferred embodiment of a "nor" gate in accordance with the present invention that is adapted to generate a binary "1" gating signal of positive polarity at the respective outputs thereof. In particular, tunnel diodes 30, 32 are serially connected from a junction 33 to a junction 34 and are poled in a manner to allow normal current flow proceeding from junction 33 to junction 34. A junction 35 constitutes the common junction intermediate the tunnel diodes 30, 32. Also, in accordance with the present invention, tunnel diode 30 is of a type having a peak current, $I_p$, of 5 milliamperes and tunnel diode 32 is of a type which has a peak current, $I_p$, which is no more than the peak current of diode 30 and is preferably of the order of 2 milliamperes. In addition, tunnel diodes 36, 38 are serially connected from a junction 39 to the junction 35 and are poled to allow normal current flow from a junction 39 to the junction 35. A junction 40 constitutes the common junction intermediate the tunnel diodes 36 and 38. Tunnel diode 36 is of a type having a peak current, $I_p$, of 5 milliamperes and tunnel diode 38 is of a type which has a peak current, $I_p$, which is no more than the peak current of diode 36 and is preferably of the order of 2 milliamperes. Tunnel diodes 30, 36 and 32, 38 are presently available commercially as 1N2941 and 1N2969, respectively.

The junction 34 is maintained at a fixed direct-current potential of the order of −200 millivolts relative to ground by means of a connection therefrom to the negative terminal of a power supply 42 which is, in turn, referenced to ground. The junctions 33, 39, on the other hand, are maintained at a fixed direct-current potentil of the order of +200 millivolts relative to ground by means of connections therefrom to the positive terminal of the power supply 42. A clock input is provided at a terminal 44 by means of voltage dividing resistors 45, 46 connected therefrom to ground and a capacitor 48 connected from the junction therebetween to junction 40 between tunnel diodes 36 and 38. Resistor 45 has a resistance of the order of 500 ohms and resistor 46 has a resistance of the order of 56 ohms thereby to provide a voltage at the common junction therebetween which is approximately 10% of the voltage applied to the clock input terminal 44. The purpose for this is to allow the use of a larger amplitude clock signal so as to minimize any effects due to variations in amplitude. The voltage appearing at the junction between resistors 46, 45 is coupled through the capacitor 48 to the junction 40 at one extremity of the tunnel diode 38. The capacitance of capacitor 48 is not critical and may, for example, be of the order of 120 micromicrofarads.

An output from the disclosed gating apparatus is provided by appropriate connections from the junction 35 intermediate the tunnel diodes 30, 32 to output terminals 50. The output signal produced is in the nature of a "current" or "no current." Inputs to the device are provided by input terminals 51, 52. The input terminals 51, 52 are connected through backward diodes 54, 55, respectively, to a common junction 57, which junction 57 is, in turn, connected through a backward diode 58 to the junction 35 and, in addition, is returned to ground through a backward diode 60. The backward diodes 54, 55 are poled in a manner to allow normal current flow towards the input terminals 51, 52, respectively; the backward diode 58 is poled in a manner to allow normal current flow towards the junction 35; and the backward diode 60 is poled in a manner to allow normal current flow towards ground. Next, a substantially constant flow of current towards the junctions 57, 40 is provided by resistors 62, 63 connected, respectively, from the junctions 57 and 40 to the positive terminal of a battery 64, an intermediate terminal of which is referenced to ground. The resistors 62, 63, 65 each have a resistance of the order of 5000 ohms, and the battery 64 provides potentials of the order of ±5 volts whereby substantially constant currents $I_1$, $I_2$, $I_3$ of the order of 1.0 milliampere flow through each of the resistors 62, 65 and 63, respectively.

Figure 3:
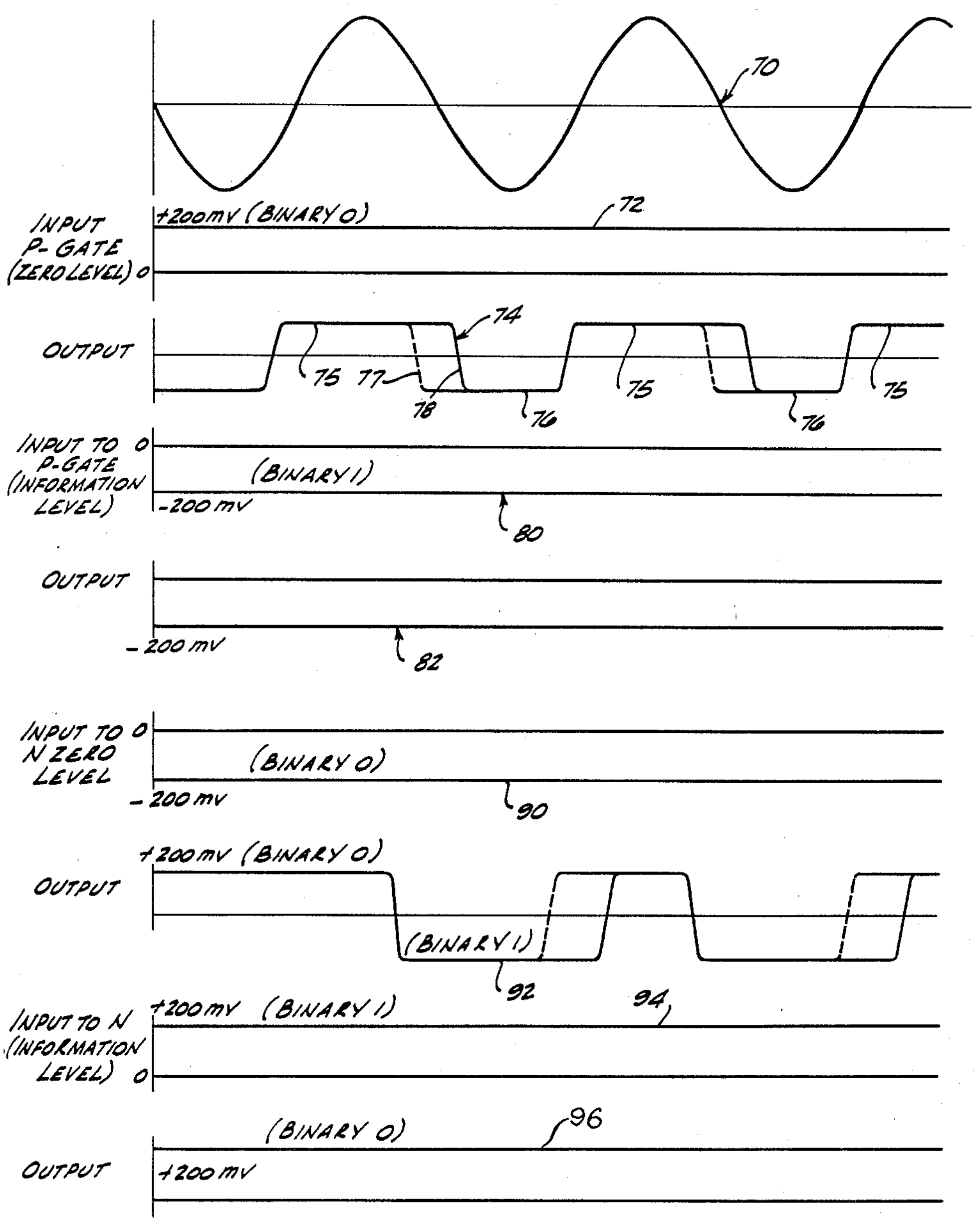
FIG. 3 illustrates waveforms of the clock together with waveforms available at the respective input and output of the gating devices of FIGS. 1 and 2.

In the operation of the apparatus of FIG. 1, signals representative of either binary "1" or binary "0" are applied to the input terminals 51, 52. For this purpose, the potential level corresponding to binary "0" is defined as +200 millivolts whereby no current flows through the backward diodes 54 or 55. In addition, the potential level corresponding to binary "1" is defined as −200 millivolts and corresponds to a current flow of the order of 0.6 milliampere flowing from the input terminals 51 or 52 through the backward diodes 54 or 55, respectively. In addition, a sinusoidal clock signal having a waveform 70, FIG. 3, is applied to the clock input terminal 44. The frequency of the clock signal determines, of course, the speed at which the apparatus functions. The frequency of this clock signal may be as low as one megacycle or less and as high as four hundred magacycles depending on the nature of the computer system. In the present case, the waveform 70 having a clock frequency of 40 megacycles, together with associated input and output waveforms corresponding to this frequency, are illustrated in FIG. 3. Lastly, as will be evident from the following description, the waveform of the clock signal, although preferably sinusoidal, may assume other periodic configurations.

The apparatus of the present invention described in connection with FIG. 1 generates an output signal having one of two different potential levels thereby to produce potential levels representative of either binary "1" or binary "0" at the output terminals at junction 35. Unlike the input terminals 51, 52, a potential level of −200 millivolts at the output terminals corresponds to binary "0" and also to zero current flow. An output potential level of +200 millivolts at the output terminals, on the other hand, is representative of binary "1" and corresponds to a current flow from the output junction 35 towards the output terminals.

Assume first that input signals corresponding to binary "0" are applied to each of the input terminals 51, 52, such as the potential level represented by the waveform 72, FIG. 3, of +200 millivolts relative to ground. It is evident that to function as a "nor" gate it is necessary that a signal representative of binary "1" or +200 millivolts be generated at the output terminals in response to signals representative of binary "0" at the input terminals 51 and 52. Referring now to FIG. 1, the potential source 64 generates a constant flow of current $I_3$ of the order of 1.0 milliampere through the resistor 63 towards the junction 40; a constant flow of current $I_2$ of the order of 1.0 milliampere through the resistor 65 away from the junction 35; and a constant flow of current $I_1$ of the order of 1.0 milliampere through the resistor 62 towards the junction 57. Also, in that the potential difference between junctions 33 and 34 is only 400 millivolts, it is evident that either tunnel diode 30 or 32 must be in the switched state and the remaining one in the unswitched state. Initially it will be assumed that tunnel diode 30 is in the switched state thereby maintaining the potential level of junction 35 at −200 millivolts. Inasmuch as the potential level at each of the input terminals 51, 52 is at +200 millivolts and the potential level at junction 35 is at −200 millivolts, a substantial portion of the current flowing through resistor 62 flows through the backward diode 58 to the junction 35. In addition, irrespective of the mode of conduction of tunnel diodes 36, 38, the clock pulse signal applied through capacitor 48 periodically lowers the potential at junction 40 and, hence, increases the potential drop from junction 40 to junction 39 to the extent that the voltage drop across tunnel diode 36 is sufficiently large as to cause it to revert to the switched mode of operation. Under these circumstances, the potential drop across tunnel diode 36 is of the order of 400 millivolts thereby maintaining the junction 40 at a potential level of the order of −200 millivolts relative to ground. In that the potential drop between junctions 35 and 40 is less than, peak voltage of tunnel diode 38, it remains or reverts to the unswitched mode of operation. Thus, at this time during the operation of the device of the present invention, current $I_1$ flows through backward diode 58 into junction 35, current $I_3$ flows through tunnel diode 38 into junction 35 and current $I_2$ flows out of junction 35 leaving a net current of the order of one milliampere flowing into the junction 35. In addition, a small current flows through tunnel diode 30 into junction 35 making a total current of somewhat greater than 1.0 milliampere. This current which flows out of junction 35 through tunnel diode 32 is less than the peak current, $I_p$=2 ma., of this tunnel diode and thus allows it to remain in the unswitched mode of operation.

Subsequently, the clock signal applied at clock input 44 makes a positive excursion in changing from the negative to the positive alternations of the sinusoidal waveform 70, thereby increasing the potential level of junction 40 to the extent that tunnel diode 36 reverts to the unswitched mode of operation, and tunnel diode 38 reverts to the switched mode of operation. The increased current flowing through tunnel diode 38 into junction 35 increases the current flowing out of junction 35 through tunnel diode 32 to the extent that the peak current, $I_p$=2 ma., thereof exceeds 2 milliamperes, thereby causing tunnel diode 32 to revert to the switched mode of operation. In that there is insufficient voltage difference between junctions 33 and 34 to maintain both tunnel diodes 30 and 32 in the switched mode of operation, tunnel diode 30 reverts to the unswitched mode, thereby changing the potential level of junction 35 to +200 millivolts relative to ground. The potential level at junction 35 under these conditions is illustrated by a portion 75 of waveform 74 which illustrates the potential at junction 35 during the period that it remains at +200 millivolts relative to ground.

During the latter portion of the positive alternations of the clock signal, the negative excursion drives the potential level at junction 40 negative to cause the respective modes of tunnel diodes 36, 38 to again switch thereby decreasing the flow of current into junction 35. The change in the mode of operation of tunnel diode 36, i.e., the reversion of tunnel diode 36 to the switched mode of operation, establishes the potential level of junction 40 at −200 millivolts relative to ground. This decrease in potential at junction 40 momentarily produces a diversion of current flowing out of junction 35 from tunnel diode 32 to tunnel diode 38, thereby causing the operating state of tunnel diodes 30, 32 to change, thus again changing the potential level of junction 35 from +200 millivolts to −200 millivolts relative to ground, as illustrated by the portions 76 of the waveform 74, FIG. 3. In the event that current is being supplied to the output leads, the time during which the change from +200 millivolts to −200 millivolts takes place is delayed, the change which takes place when no current is being supplied to the output leads being illustrated by solid line 78, and the change when maximum load current is being provided being represented by dashed line portion 77 of waveform 74. As is evident from the above, the switching of the tunnel diodes 30, 32, 36 and 38 produces the information and zero level portions 75, 76, respectively, of waveform 74 which occurs periodically for every cycle of the clock signal represented by waveform 70 when the inputs 51, 52 are all at binary "0."

Alternative to the above situation wherein zero level signals were applied to all of the inputs 51, 52 of the gating apparatus, there is the situation where an information level signal such as represented by waveform 80, FIG. 3, is applied to one or more of the input terminals 51, 52. An information level input signal for the P gate of FIG. 1 constitutes a potential level of −200 millivolts relative to ground. Commencing at the mid-portion of a negative alternation of the clock signal represented by waveform 70, it is evident that irrespective of the gating signals applied at the input terminals 51, 52 the tunnel diodes 30, 32, 36, 38 will be switched in a manner to maintain the potential level of junction 35 at −200 millivolts relative to ground. Under these circumstances, the current, $I_1$, flowing through the resistor 62 is diverted towards the input terminal to which the information level signal of −200 millivolts is applied. This current is subtracted from current which would normally flow through backward diode 58 toward junction 35. The subsequent positive excursion of the clock signal at junction 40, together with the increase in current flowing into junction 35 through tunnel diode 38, is now insufficient to effect a change in the state of conduction of the tunnel diode 32. That is, the increase of current flowing into junction 35 to tunnel diode 38 due to the clock signal under these circumstances is insufficient to exceed the peak current, $I_p$, of 2 milliamperes of the tunnel diode 32. Thus, the potential level at the output leads under circumstances where an information level signal is applied to one or more of the input terminals 51, 52 remains constant at −200 millivolts relative to ground as represented by waveform 82, FIG. 3.

Figure 2:
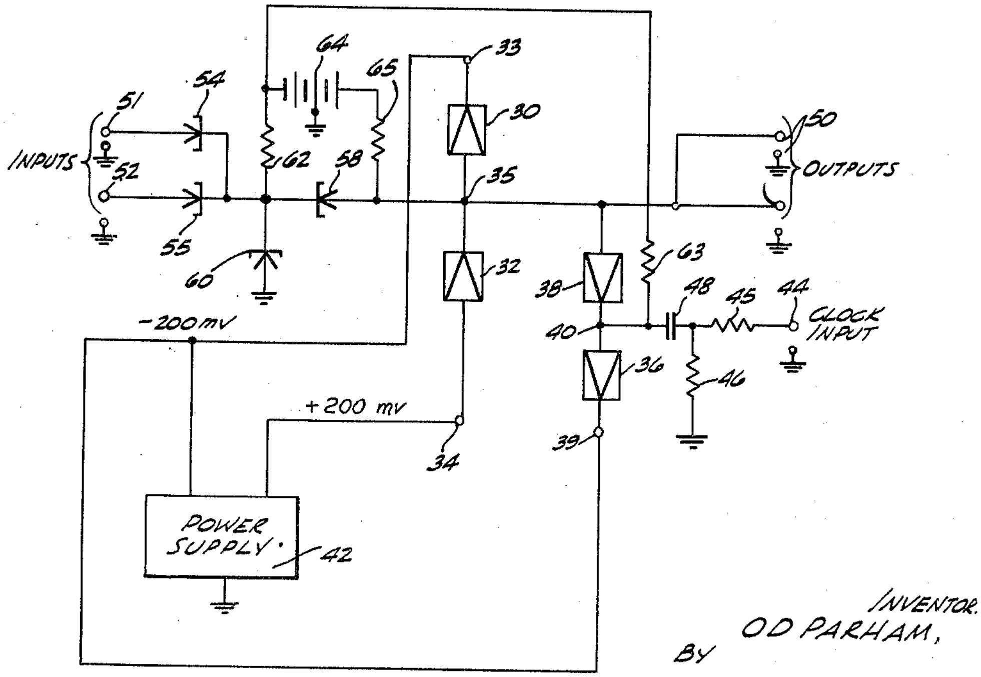
FIG. 2 shows an "N" embodiment of a "nor" gate which constitutes the apparatus of FIG. 1 with all polarities reversed adapted to accept current from an output load.

Referring now to FIG. 2, there is shown the device of FIG. 1 with appropriate modifications to effect operation as a "nor" gate responsive to a signal of +200 millivolts relative to ground representative of binary "1" and to a signal of −200 millivolts relative to ground representative of binary "0." In particular, the respective polarities of tunnel diodes 30, 32, 36, 38; backward diodes 54, 55, 58, 60; and the respective outputs of power supply 42 and battery 64 are reversed from that described in FIG. 1.

In operation of the device of FIG. 2, input signals of a potential level of +200 or −200 millivolts, representative of binary "1" or binary "0," respectively, are applied to the input terminals 51, 52 in the same manner as described in connection with FIG. 1. Signals of potential levels of −200 millivolts or +200 millivolts, representative of binary "1" or "0," respectively, are generated at the output terminals. As before, the clock signal 70 clears the device by decreasing the current flow through the tunnel diodes 32, 38 to the extent that current flow through each of the tunnel diodes reverts to the unswitched mode. Under these circumstances, tunnel diode 30 is changed to the switched mode of operation thereby maintaining the potential level of junction 35 at +200 millivolts representative of binary "0." In general, the operation of the device of FIG. 2 is the same as that of FIG. 1 with the exception that the direction of current flow throughout the apparatus is reversed. When signals representative of binary "0," i.e., of a potential level of −200 millivolts relative to ground such as illustrated by waveform 90, FIG. 3, are applied to all the input terminals 51, 52, a waveform 92 results. This waveform 92 is a bilevel signal having +200 millivolts representative of binary "0" and −200 millivolts representative of binary "1." The binary "1" signal level is produced concurrent with the negative alternation of sinusoidal clock signal represented by waveform 70.

In the event that one or more signals representative of binary "1," i.e., of a potential level of +200 millivolts relative to ground as illustrated by waveform 94, are applied to one or more of the input terminals 51, 52, a constant level output signal representative of binary "0" is generated at the output terminals of the device. This output signal illustrated by waveform 96, FIG. 3, constitutes a unilevel signal of +200 millivolts relative to ground.

Lastly, in the operation of the device of the present invention, it is evident that appropriate signals need only be applied to the input terminals during the switching period. In the case of the device of FIG. 1, this period is the positive excursion of the respective negative alternations of waveform 70. Alternatively, in the case of the device of FIG. 2, the switching period takes place during the negative excursion of the respective positive alternations of the waveform 70.

Although the invention has been shown in connection with a certain specific embodiment, it will be readily apparent to those skilled in the art that various changes in form and arrangement of parts may be made to suit requirements without department from the spirit and scope of the invention.

What is claimed is:

1. A digital computer device comprising:

(*a*) first and second tunnel diodes having first and second peak currents, respectively, connected in the order named from a first junction to an output junction and from said output junction to a second junction, said first and second tunnel diodes being poled to allow normal current flow therethrough in a common direction from said first to said second junction;

(*b*) means connected across said first and second junctions for maintaining the potential difference thereacross of a polarity to effect current flow in said common direction and of a value to preclude both said first and second tunnel diodes simultaneously conducting in the switched state;

(*c*) third and fourth tunnel diodes serially connected in the order named from said output junction to a clock input junction and from said clock input junction to said first junction, said third and fourth tunnel diodes being poled to allow normal current flow therethrough in said common direction from said first junction to said output junction;

(*d*) means connected to said output junction for normally maintaining a predetermined residual current flow through said second tunnel diode;

(*e*) means responsive to no less than one bilevel input signal and connected to said means for maintaining said predetermined residual current flow through said second tunnel diode for diverting said predetermined residual current flow through said second tunnel diode in response to a preselected combination of potential levels of said no less than one input signal; and (*f*) means coupled to said clock input junction for periodically decreasing and increasing the potential level thereat thereby to periodically switch said second tunnel diode to the switched mode of current conduction when said predetermined residual current flow through said second tunnel diode is not diverted whereby a substantially constant first potential level is produced at said output junction and to allow said second tunnel diode to remain in the unswitched mode of current conduction when said predetermined residual current flow therethrough is diverted whereby a substantially constant second potential level is produced at said output junction.

2. The digital computer device as defined in claim 1 wherein said means coupled to said clock input junction for periodically decreasing and increasing the potential level thereat includes a single phase source of sinusoidal potential and a direct-current source of biasing current connected to said clock input junction.

3. A digital computer device comprising:

(*a*) first and second tunnel diodes having first and second peak currents, respectively, connected in the order named from a first junction to an output junction and from said output junction to a second junction, said first and second tunnel diodes being poled to allow normal current flow therethrough from said first to said second junction and said first peak current being greater than said second peak current;

(*b*) means connected across said first and second junctions for maintaining the potential difference thereacross of a polarity to effect normal current flow through said first and second tunnel diodes and of a value to preclude both said first and second tunnel diodes simultaneously conducting in the switched state whereby said second tunnel diode normally reverts to the switched mode of current conduction to produce a substantially constant first potential level at said output junction;

(*c*) third and fourth tunnel diodes having third and fourth peak currents, respectively, connected in the order named from said output junction to a clock input junction and from said clock input junction to said first junction, said third and fourth tunnel diodes being poled to allow normal current flow therethrough from said first junction to said output junction and said third peak current being less than said fourth peak current and substantially equal to said second peak current;

(*d*) first and second backward diodes connected from said output junction to a third junction and from said third junction to ground, respectively, said first backward diode being poled to allow normal current flow towards said output junction and said second backward diode being poled to allow normal current to flow to ground;

(*e*) means connected to said third junction for maintaining a predetermined current flow thereto where-a residual current normally flows through said second tunnel diode;

(*f*) means connected to said output junction for maintaining a current flow therefrom substantially equal to said predetermined current;

(*g*) means connected to said third junctions and responsive to a plurality of bilevel input signals, representative of binary "1" or binary "0" for diverting at least a portion of said residual current normally flowing through said second tunnel diode only when no less than one of said plurality of bilevel input signals is representative of binary "1"; and (*h*) means including a source of alternating potential coupled to said clock input junction for periodically decreasing and increasing the potential level thereat thereby to switch said second tunnel diode during increases in potential level at said clock input junction only when substantially no portion of said residual current flowing through said second tunnel diode is diverted, the switching of said second tunnel diode generating a second potential level at said output junction.

4. A digital computer device comprising:

(*a*) first and second tunnel diodes having first and second peak currents, respectively, connected in the order named from a first junction to an output junction and from said output junction to a second junction, said first and second tunnel diodes being poled to allow normal current flow therethrough from said second to said first junction and said first peak current being greater than said second peak current;

(*b*) means connected across said first and second junctions for maintaining the potential difference thereacross of a polarity to effect normal current flow through said first and second tunnel diodes and of a value to preclude both said first and second tunnel diodes simultaneously conducting in the switched state whereby said second tunnel diode normally reverts to the switched mode of current conduction to produce a substantially constant first potential level at said output junction;

(*c*) third and fourth tunnel diodes having third and fourth peak currents, respectively, connected in the order named from said output junction to a clock input junction and from said clock input junction to said first junction, said third and fourth tunnel diodes being poled to allow normal current flow therethrough from said output junction to said first junction and said third peak current being less than said fourth peak current and substantially equal to said second peak current;

(*d*) first and second backward diodes connected from said output junction to a third junction and from said third junction to ground, respectively, said first backward diode being poled to allow normal current flow away from said output junction and said second backward diode being poled to allow normal current flow towards said third junction;

(*e*) means connected to said third junction for maintaining a predetermined current flow therefrom whereby a residual current normally flows through said second tunnel diode;

(*f*) means connected to said output junction for maintaining a current flow therefrom substantially equal to said predetermined current;

(*g*) means connected to said third junction and responsive to a plurality of bilevel input signals, representative of binary "1" or binary "0," for diverting at least a portion of said residual current normally flowing through said second tunnel diode only when no less than one of said plurality of bilevel input signals is representative of binary "1"; and (*h*) means including a source of alternating potential coupled to said clock input junction for periodically decreasing and increasing the potential level thereat thereby to switch said second tunnel diode during decreases in potential level at said clock input junction only when substantially no portion of said residual current flowing through said second tunnel diode is diverted, the switching of said second tunnel diode generating a second potential level at said output junction.

No references cited.